United States Patent
Gerde et al.

(10) Patent No.: US 11,423,055 B1
(45) Date of Patent: Aug. 23, 2022

(54) OPTIMIZATION BASED ON ARCHETYPES

(71) Applicant: INTUIT INC., Mountain View, CA (US)

(72) Inventors: Matthew Gerde, Frisco, TX (US); Deepankar Mohapatra, The Colony, TX (US); Ram Mohan Shamanna, Frisco, TX (US); Ronnie Douglas Douthit, Frisco, TX (US)

(73) Assignee: INTUIT INC., Mountain View, CA (US)

( * ) Notice: Subject to any disclaimer, the term of this patent is extended or adjusted under 35 U.S.C. 154(b) by 678 days.

(21) Appl. No.: 16/153,394

(22) Filed: Oct. 5, 2018

(51) Int. Cl.
| | |
|---|---|
| *G06F 16/00* | (2019.01) |
| *G06F 16/28* | (2019.01) |
| *G06Q 40/00* | (2012.01) |
| *G06N 20/00* | (2019.01) |

(52) U.S. Cl.
CPC ........... *G06F 16/285* (2019.01); *G06N 20/00* (2019.01); *G06Q 40/10* (2013.01)

(58) Field of Classification Search
CPC .......................... G06F 16/9535; G06F 16/285
See application file for complete search history.

(56) References Cited

U.S. PATENT DOCUMENTS

| | | | | |
|---|---|---|---|---|
| 2008/0147527 A1* | 6/2008 | McIntyre | ............. | G06Q 40/123 705/31 |
| 2009/0234684 A1* | 9/2009 | Stoke | ................... | G06Q 40/123 705/7.36 |
| 2012/0030076 A1* | 2/2012 | Checco | ............... | G06Q 40/123 707/E17.014 |
| 2016/0247239 A1* | 8/2016 | Houseworth | ........ | G06Q 40/123 |
| 2017/0032468 A1* | 2/2017 | Wang | .................. | G06Q 40/123 |
| 2019/0065596 A1* | 2/2019 | Meron | ................. | G06K 9/6218 |

OTHER PUBLICATIONS

De Roux, Daniel, et al. "Tax fraud detection for under-reporting declarations using an unsupervised machine learning approach." Proceedings of the 24th ACM SIGKDD International Conference on Knowledge Discovery & Data Mining. 2018.*
Milner, Cas, and Bjarne Berg. "Tax Analytics Artificial Intelligence and Machine Learning—Level 5." PWC Advanced Tax Analytics & Innovation (2017).*

* cited by examiner

*Primary Examiner* — Nan Hutton
(74) *Attorney, Agent, or Firm* — DLA Piper LLP (US)

(57) ABSTRACT

A processor may filter data to generate a subset of the data less than an entire set of the data. The subset may include at least one string and at least one numeric value. The processor may match the at least one string and the at least one numeric value to one of a plurality of archetypes by applying a clustering algorithm. Each archetype may include a subset of archetype data less than an entire set of archetype data. The processor may compare the entire set of data to the entire set of archetype data to identify at least one difference between the entire set of data and the entire set of archetype data. The processor may apply at least one optimization to address the at least one difference.

36 Claims, 5 Drawing Sheets

OPTIMIZATION BASED ON ARCHETYPES

DETAILED DESCRIPTION OF SEVERAL EMBODIMENTS

Many types of documents and/or electronic forms may be repeatedly filled out and/or submitted by large numbers of users and/or in many separate instances for a single user. For example, millions of tax returns may be prepared and filed every year, and any given taxpayer may prepare and file new tax returns every year. Such documents may include a large amount of data and may vary significantly from one instance to another. For example, each separate taxpayer's return may be customized to that specific individual or business and may therefore be very different from every other taxpayer's return. Even for a specific taxpayer, returns may vary significantly year over year.

However, in many cases, there may be identifiable similarities among individual documents. Moreover, similarities in one aspect of a document may suggest possible similarities in other aspects. For example, a first taxpayer may be able to take advantage of similar tax deductions and/or credits as a second similarly situated taxpayer. However, the first taxpayer (or her accountant) may be unaware of the deductions and/or credits used by the second taxpayer. Embodiments disclosed herein may automatically create archetypes of documents or other data sets (e.g., tax return data archetypes) and/or use the archetypes to automatically identify and/or implement potential improvements to similar documents or data sets.

Embodiments disclosed herein may perform archetype creation and/or data optimization in a manner that is accurate, fast, and processing efficient, thereby providing technical improvements over other systems and methods configured to identify optimizations. For example, in some embodiments, processor and/or memory intensive machine learning may be performed prior to deployment of a prediction service, and the prediction service may leverage the results of the machine learning to return quick, but accurate, results. In some embodiments, source data preprocessing and machine learning output postprocessing may improve the efficiency of subsequent machine learning processing, thereby improving not only the machine learning itself, but also the resulting output. These and other improvements are described in detail below.

Figure 1:
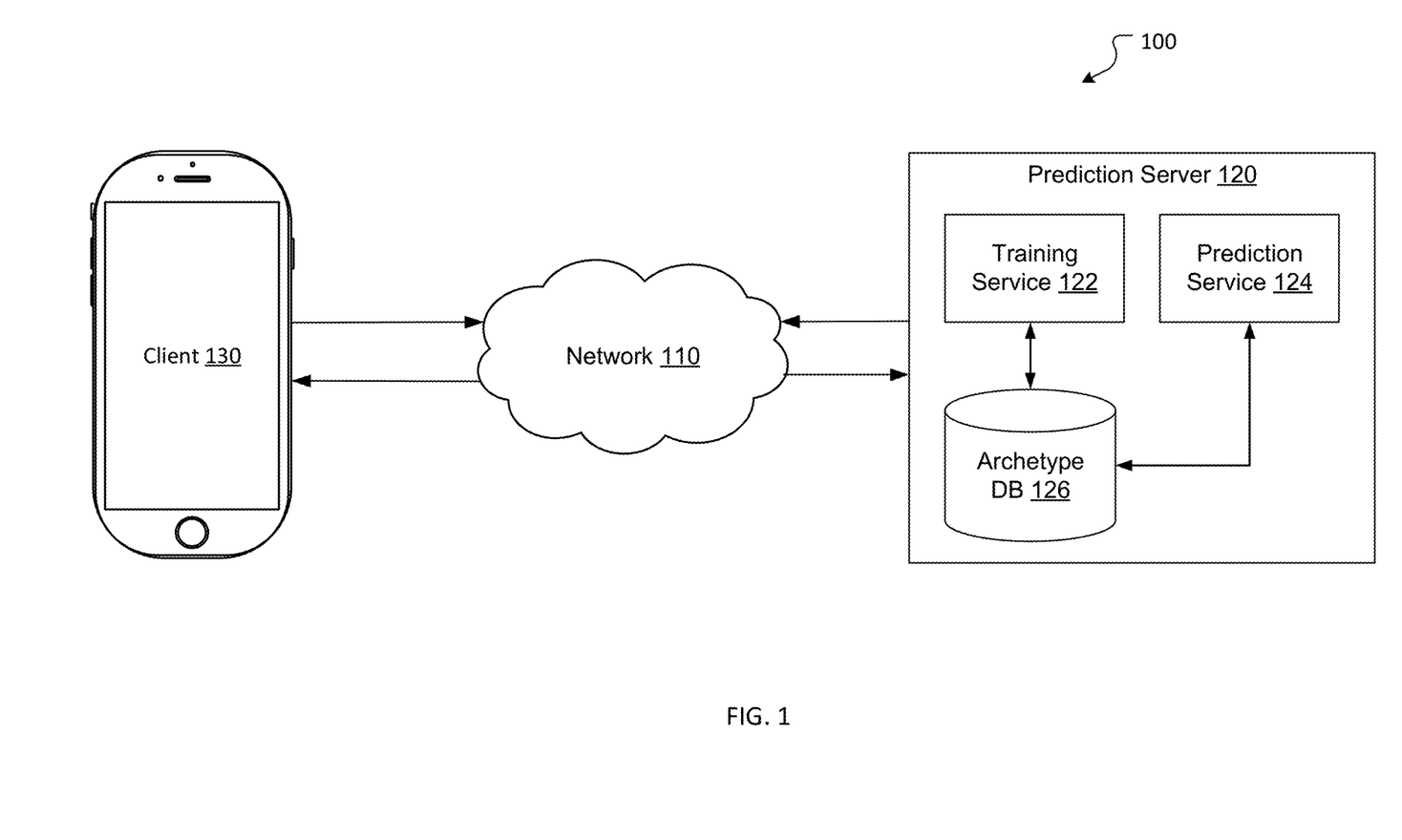
FIG. 1 shows a system configured to generate archetypes and optimize data according to an embodiment of the present disclosure.

FIG. 1 shows a system 100 configured to generate archetypes and optimize data according to an embodiment of the present disclosure. System 100 may include prediction server 120 and at least one client 130. Prediction server 120 and at least one client 130 may communicate with one another through at least one network 110. Network 110 may be the Internet and/or other public or private networks or combinations thereof. For example, in some embodiments, prediction server 120 and at least one client 130 may communicate with one another over secure channels (e.g., one or more TLS/SSL channels).

In some embodiments, client 130 may be any device configured to provide access to remote applications. For example, client 130 may be a smartphone, personal computer, tablet, laptop computer, or other device. A user, such as a taxpayer or an accountant, may use client 130 to prepare modernized e-file (MeF) data for filing as federal income tax returns or similar documents (e.g., state tax return documents). Client 130 may prepare MeFs locally and/or by presenting a user interface providing interaction with back-end systems (e.g., of which prediction server 120 may be at least a part). In some embodiments, MeFs may include additional data beyond what is required for e-filing; an MeF with additional data is described herein as an MeF++.

Prediction server 120 may include training service 122, which may perform relatively high processor load operations such as creating archetypes that may be compared against MeF++ data from client 130. Training service 122 may store the archetypes and/or other data in archetype database 126. Example processing that may be performed by training service 122 is described with respect to FIGS. 3 and 4 below. Prediction service 124 may compare archetypes generated by training service 122 and/or stored in archetype database 126 to optimize MeF++ data provided by client 130 in an efficient and/or appropriate manner. Example processing that may be performed by prediction service 124 is described with respect to FIG. 5 below.

Prediction server 120 and client 130 are each depicted as single devices for ease of illustration, but those of ordinary skill in the art will appreciate that prediction server 120 and/or client 130 may be embodied in different forms for different implementations. For example, prediction server 120 may include a plurality of devices or may be embodied in a single device or device cluster depending on embodiment. In another example, a plurality of clients 130 may be connected to network 110 and may provide MeF++ data for archetype generation and/or MeF++ optimization as described herein. A single user may have multiple clients 130, and/or there may be multiple users each having their own client(s) 130. Furthermore, as noted above, network 110 may be a single network or a combination of networks, which may or may not all use similar communication protocols and/or techniques.

Figure 2:
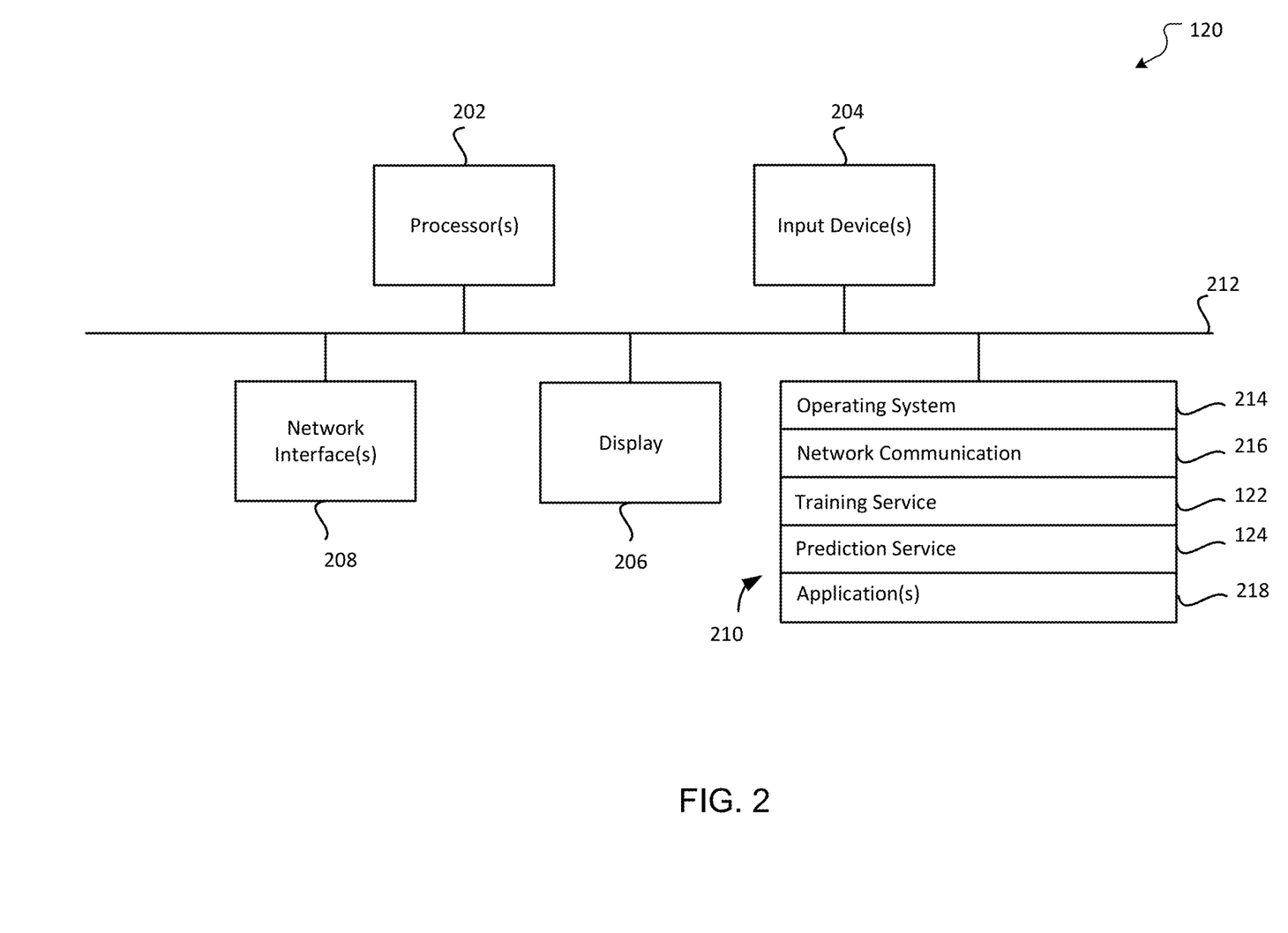
FIG. 2 shows a prediction server according to an embodiment of the present disclosure.

FIG. 2 is a block diagram of an example prediction server 120. Prediction server 120 may be implemented on any electronic device that runs software applications derived from instructions, including without limitation personal computers, servers, smart phones, media players, electronic tablets, game consoles, email devices, etc. In some implementations, prediction server 120 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Training service 122 and/or prediction service 124 may be implemented at least in part by instructions stored in memory 210 in order to provide the training service 122 and/or prediction service 124 functionality described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
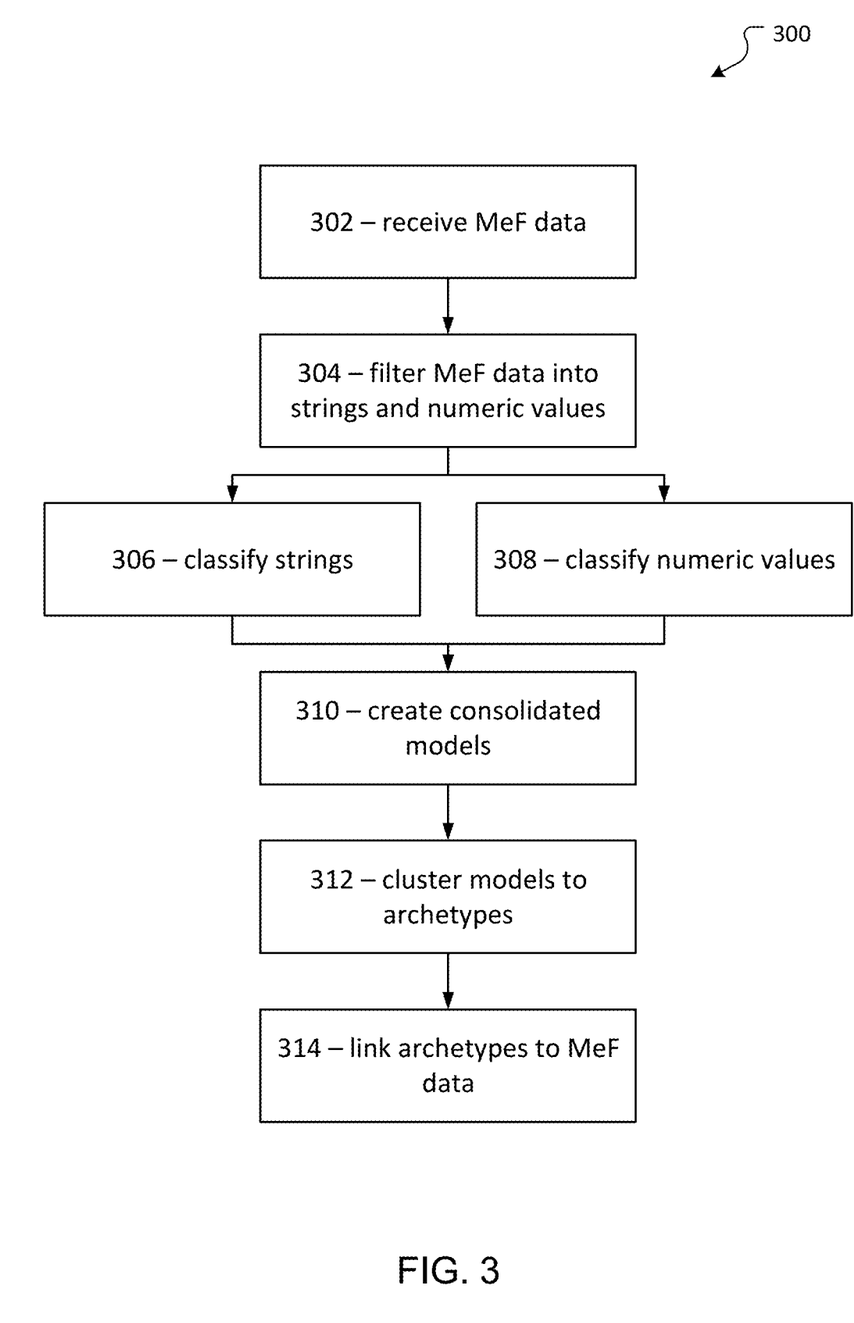
FIG. 3 shows an archetype generation process according to an embodiment of the present disclosure.

FIG. 3 shows an archetype generation process 300 according to an embodiment of the present disclosure. Prediction server 120 may perform process 300 to create archetypes that may be used for data optimization (e.g., in process 500 described below). In the example described herein, training service 122 may process tax-related data (e.g., MeF++ data) to create the archetypes. However, archetypes may be created from any type of data.

At 302, training service 122 may receive data from which the archetypes may be generated. For example, the data may include MeF data, which may include tax data arranged according to one or more XML schema and may be an accepted format for electronic tax return submission. In some embodiments, the data may include MeF++ data, which may add data gathered and/or generated by tax preparation software in the process of generating MeFs. The added data may include inputs provided by users, intermediate calculations used to generate final numbers for the MeF, and/or other data. Training service 122 may receive MeF++ data accumulated by multiple clients 130 and/or over multiple years. For example, in some embodiments, every MeF++ for every tax return filed using system 100 (or a large subset thereof) may be available in database 126 or some other data store accessible to prediction server 120. Training service 122 may take in this accumulated MeF++ data for processing.

At 304, training service 122 may filter the MeF++ data. For example, training service 122 may apply a filter that has been configured to retain data used to define an archetype and remove all other data. An archetype may be defined according to any data set, so the filter may be customized for any number of uses. For example, to build archetypes relevant for the MeF++ use case, data that may be indicative of a taxpayer's demographic may be selected for the archetype. For example, such data may include the taxpayer's location, occupation, family status, age, income, housing status, etc. Data not selected may be filtered out. Each MeF++ may be reduced based on the settings specified by the filter. In some examples, filtering may reduce data sets to be processed from the order of tens of thousands of separate elements to hundreds of separate elements. After filtering, each piece of remaining data may be broadly classified into one of two categories. The data may be a string (e.g., location), or the data may be a numeric value (e.g., income). For example, a filtered data set may include strings for the taxpayer's location and occupation and numeric values for the taxpayer's age and income.

Training service 122 may use one or more machine learning algorithms to classify the filtered data. For example, some embodiments may perform separate machine learning classification for the strings and the numeric values. This may allow training service 122 to apply different algorithms to the different data types, thereby improving performance and/or accuracy of the classification. For example, training service 122 may perform Bayes classification on the strings and K-nearest neighbor classification on the integers. Other embodiments may use different algorithms for either or both of the classifications, such as logistic regression, unsupervised clustering, and/or convolutional neural network classifiers.

At 306, training service 122 may classify the strings for each reduced MeF++. For example, training service 122 may apply supervised learning algorithm(s) to each MeF++ to classify the MeF++ as corresponding to one or more categories. For example, training service 122 may apply Bayes classification to interpret categorical meaning from the text of the strings. This may include, for example, categorizing the MeF++ as belonging to a taxpayer living in a particular state (e.g., based on user-entered city/state data), as belonging to a taxpayer having a particular occupation type (e.g., based on specific title, employer, etc. data entered by a user), etc.

At 308, training service 122 may classify the numeric values for each reduced MeF++. For example, training service 122 may apply supervised learning algorithm(s) to each MeF++ to classify the MeF++ as corresponding to one or more categories. For example, training service 122 may apply K-nearest neighbor classification to interpret categorical meaning from the values of the numbers. This may include, for example, categorizing the MeF++ as belonging to a taxpayer within a certain income tax bracket (e.g., based on user-entered income data), as belonging to a taxpayer having a particular liability level (e.g., based on user-entered expense data), etc.

At 310, training service 122 may create a consolidated model for each set of classifications for each MeF++. A consolidated model for a given MeF++ may include a combination of the classifications for the MeF++ as determined at 306 and 308. For example, the consolidated model may include string classifications such as a state classification, an occupation type classification, a housing type classification, a marital status classification, etc. The consolidated model may also include numeric classifications such as an age classification, an income classification, an expenses classification, etc. For one example, non-limiting use case, a model may include a state string and an occupation string as well as an age string and an income string. By consolidating the classifications after they are performed separately, training service 122 may more effectively and efficiently classify the data. For example, Bayes classification may be an effective and efficient classification method for text, but K-nearest neighbor classification may be more effective and efficient for numbers. By dividing the data and performing separate classifications, then reuniting the data within consolidated models, training service 122 may process the very large data sets associated with MeFs++ (which may be large even after filtering) in an efficient, but accurate, manner.

At 312, training service 122 may cluster the consolidated models from 310 to create the archetypes. Training service 122 may define archetypes and use one or more machine learning algorithms to identify clusters of models that are similar to one another. For example, training service 122 may use a k-means clustering algorithm or other clustering algorithm (e.g., unsupervised clustering and/or cascaded support vector machines) to cluster models together. The outcome may be a plurality of archetype definitions including models clustered around each archetype. In some embodiments, the machine learning algorithm may take as inputs a plurality of archetype definitions (e.g., each specifying a set of taxpayer attributes, such as a combination of income level, age, location, marital status, etc.—in some cases each category selected for inclusion by the filtering at 304). Training service 122 may cluster the actual consolidated models based on actual MeF++ data around each archetype definition. Thus, each archetype definition may include a range of actual reduced MeF++ examples. For example, an archetype may be men aged 35-45 with an income of 100,000+ living in Branson, Mo., and there may be a set of reduced MeF++ examples associated therewith.

At 314, training service 122 may link the archetypes with their reduced MeF++ clusters to the full MeF++ data associated with each reduced MeF++ in the cluster. As a result, each archetype may include not only the reduced MeF++ data, which was reduced to improve machine learning efficiency, but also the filtered-out MeF++ data. In some embodiments, the reduced MeF++ data may be linked with a larger, but still reduced, set of MeF++ data. For example, training service 122 may use principal component analysis on the full MeF++ data set to identify features having a variance above a predetermined threshold and store those variable features as the larger MeF++ data set under the assumption that the variable features may be the most relevant. Accordingly, each archetype may include a range of complete taxpayer data sets that may be associated with the archetype. The result is a very detailed archetype that was generated in a computationally efficient manner (e.g., by ignoring unnecessary details for classification, but bringing them back in afterwards). Training service 122 may store the resulting clustered data, the full MeF++ data, and/or the linking data in archetype database 126. For example, an archetype may be men aged 35-45 with an income of 100,000+ living in Branson, Mo., and there may be a set of reduced MeF++ examples associated therewith. After processing at 314, there may also be a set of full MeF++ examples associated therewith, providing a rich picture of individuals who are members of the archetype.

Figure 4:
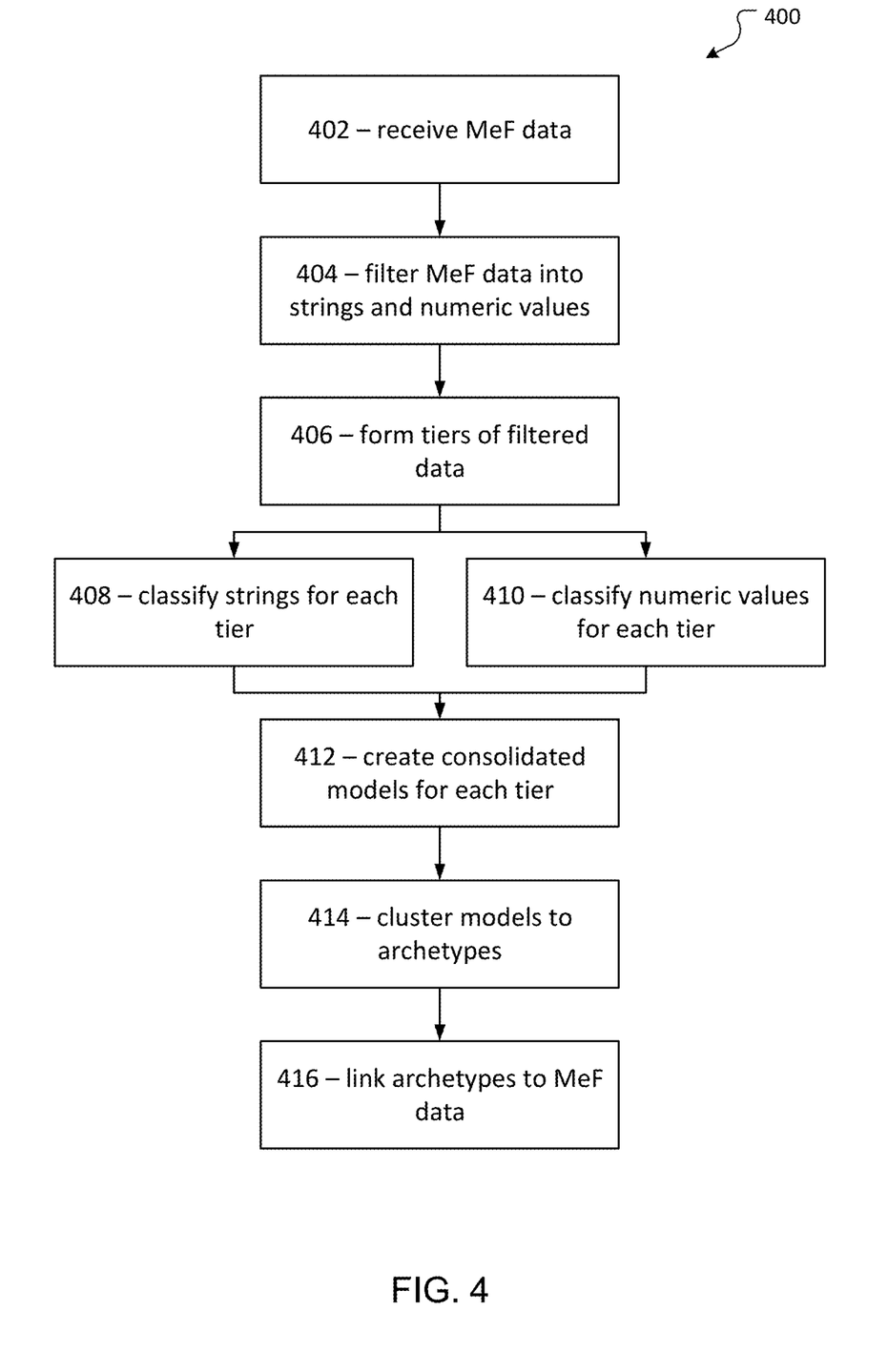
FIG. 4 shows a tiered archetype generation process according to an embodiment of the present disclosure.

FIG. 4 shows a tiered archetype generation process 400 according to an embodiment of the present disclosure. Prediction server 120 may perform process 400 to create archetypes that may be used for data optimization (e.g., in process 500 described below). Process 400 may differ from process 300 by introducing tiered archetypes. As described below, tiered archetypes may provide further processing efficiencies for training service 122 and/or may provide greater matching accuracy. In the example described herein, training service 122 may process tax-related data (e.g., MeF++ data) to create the archetypes. However, archetypes may be created from any type of data.

At 402, training service 122 may receive data from which the archetypes may be generated. For example, the data may include MeF and/or MeF++ data. Training service 122 may receive accumulated MeF++ data in a similar manner to 302 described above. Training service 122 may take in this accumulated MeF++ data for processing.

At 404, training service 122 may filter the MeF++ data. For example, training service 122 may apply a filter that has been configured to retain data used to define an archetype and remove all other data. An archetype may be defined according to any data set, so the filter may be customized for any number of uses. For example, as with 304 described above, to build archetypes relevant for the MeF++ use case, data that may be indicative of a taxpayer's demographic may be selected for the archetype. Each MeF++ may be reduced based on the settings specified by the filter. In some examples, filtering may reduce data sets to be processed from the order of tens of thousands of separate elements to hundreds of separate elements. After filtering, each piece of remaining data may be broadly classified into one of two categories. The data may be a string (e.g., location), or the data may be a numeric value (e.g., income).

At 406, training service 122 may divide the reduced MeF++ data into tiers. Each tier may include a subset of the reduced MeF++ data for a given taxpayer. For example, a single MeF++ data set may be divided into a main tier (e.g., high level details such as location, age, marital status, and income) and one or more specific tiers (e.g., a tier including only investment-related categories, a tier including only dependent-related categories, a tier including only expense-related categories, etc.). Any scheme for dividing the reduced MeF++ data into tiers may be employed. As a result, the machine learning classification and/or clustering algorithms may work on tiers individually, rather than entire reduced MeF++ data sets. For example, there may be a first tier of women below age 25 who make $25,000-35,000 a year and live in Anchorage, Ak. Beneath this tier, there may be separate tiers for dependencies (e.g., a tier for women without children and a separate tier for women with children), tiers for investments (e.g., a tier for women who invest in the stock market and a separate tier for women who don't), etc.

Training service 122 may use one or more machine learning algorithms to classify the filtered data. As in process 300, training service 122 may apply different algorithms to the different data types, thereby improving performance and/or accuracy of the classification. For example, training service 122 may perform Bayes classification on the strings and K-nearest neighbor classification on the integers.

At 408, training service 122 may classify the strings for each tier of each reduced MeF++. For example, training service 122 may apply supervised learning algorithm(s) to each tier to classify the tier as corresponding to one or more categories. For example, training service 122 may apply Bayes classification to interpret categorical meaning from the text of the strings, similar to 306 described above. As a result of the tier creation at 406, the machine learning classification may work on tiers individually, rather than entire reduced MeF++ data sets. Training on smaller data sets may be significantly faster than training on large ones, even with the increased overall number of data sets, so the division into tiers may improve the speed of processing at 408 as compared with 306 above.

At 410, training service 122 may classify the numeric values for each tier of each reduced MeF++. For example, training service 122 may apply supervised learning algorithm(s) to each tier to classify the tier as corresponding to one or more categories. For example, training service 122 may apply K-nearest neighbor classification to interpret categorical meaning from the values of the numbers, similar to 308 described above. As a result of the tier creation at 406, the machine learning classification may work on tiers individually, rather than entire reduced MeF++ data sets. Training on smaller data sets may be significantly faster than training on large ones, even with the increased overall number of data sets, so the division into tiers may improve the speed of processing at 410 as compared with 308 above.

At 412, training service 122 may create a consolidated model for each set of classifications for each tier of each MeF++. A consolidated model for a given tier may include a combination of the classifications for the tier as determined at 408 and 410. For example, the consolidated model may include string classifications and/or numeric classifications selected for the tier at 406. By consolidating the classifications after they are performed separately, training service 122 may more effectively and efficiently classify the data, as described above with respect to 310.

Figure 5:
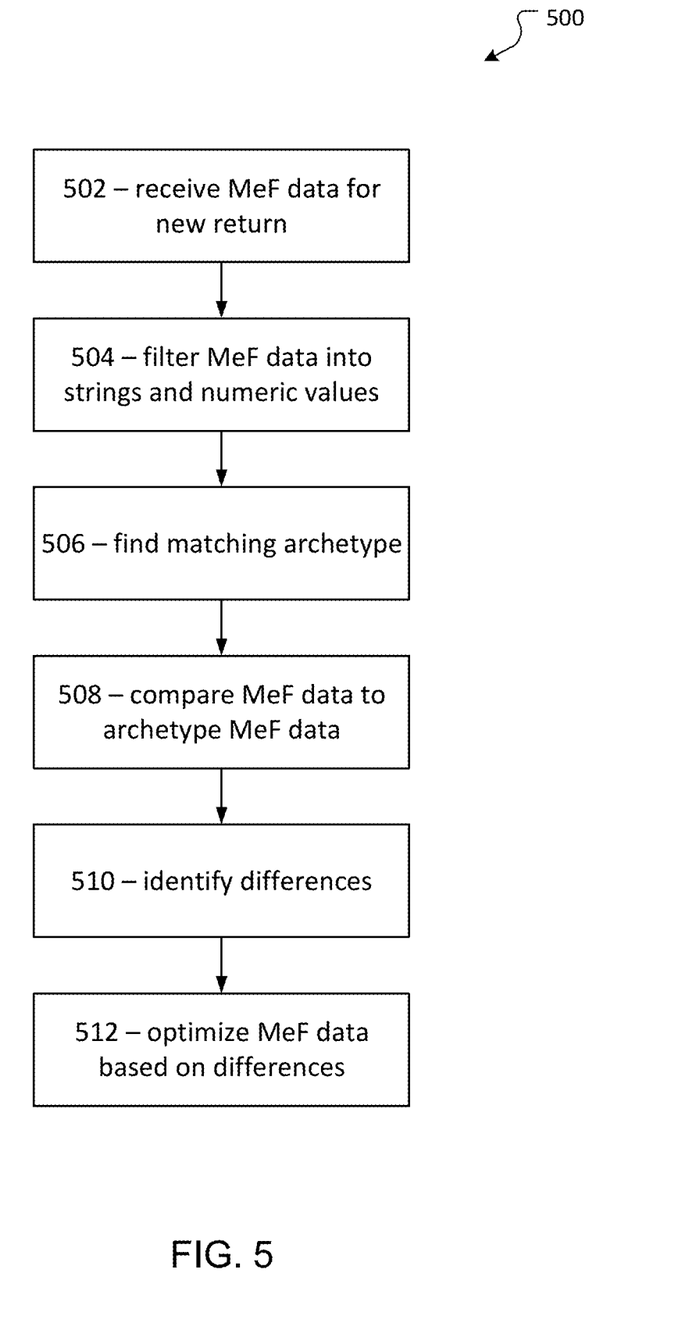
FIG. 5 shows a data optimization process according to an embodiment of the present disclosure.

At 414, training service 122 may cluster the consolidated models from 412 to create the tiered archetypes. Training service 122 may define archetypes and use one or more machine learning algorithms to identify clusters of models that are similar to one another. For example, training service 122 may use a k-means clustering algorithm or other clustering algorithm (e.g., unsupervised clustering and/or cascaded support vector machines) to cluster models together. The outcome may be a plurality of archetype definitions including models clustered around each archetype. In some embodiments, the machine learning algorithm may take as inputs a plurality of archetype definitions and may cluster the actual consolidated models based on actual MeF++ data around each archetype definition. Thus, each archetype definition may include a range of actual reduced MeF++ examples within each respective tier. Because the reduced MeF++ data has been further subdivided into tiers in process 400, when prediction service 124 uses tiered data to analyze a new MeF++ (e.g., as described below in process 500), the new MeF++ may be matched with one or more tier archetypes instead of or in addition to one or more complete MeF++ archetypes, potentially providing greater accuracy and/or more specific matching. For example, an individual may match the main tier (women under 25 who make $25,000-35,000 a year and live in Anchorage, Ak.), but may still be further categorized into one or more lower level tiers (e.g., an individual may be in the main tier and both the "no dependents" and "has investments" tiers), providing more granular groupings of individuals.

At 416, training service 122 may link the archetypes with their reduced MeF++ tier clusters to the full MeF++ data associated with each reduced MeF++ in the cluster. As a result, each archetype may include not only the reduced MeF++ data, which was reduced to improve machine learning efficiency, but also the filtered-out MeF++ data (e.g., or a subset thereof reduced using principal component analysis as described above or some other method). Accordingly, each archetype may include a range of complete taxpayer data sets that may be associated with the archetype. The result is a very detailed archetype that was generated in a computationally efficient manner (e.g., by ignoring unnecessary details for classification, but bringing them back in afterwards). Training service 122 may store the resulting clustered data, the full MeF++ data, and/or the linking data in archetype database 126.

FIG. 5 shows a data optimization process 500 according to an embodiment of the present disclosure. Prediction server 120 may perform process 500 to optimize data based on archetypes (e.g., created by processes 300 and/or 400 described above). In the example described herein, prediction service 124 may optimize tax-related data (e.g., MeF++ data). However, any type of data may be optimized assuming corresponding archives for the data have been created.

At 502, prediction service 124 may receive data to be optimized. For example, prediction service 124 may receive MeF or MeF++ data (e.g., from client 130) for a single tax return submission.

In order to determine an archetype corresponding to the received MeF++ data, prediction service 124 may convert the MeF++ data into a similar format to the clustered data generated as described above (e.g., in process 300 and/or 400) and stored in archetype database 126. At 504, prediction service 124 may may filter the MeF++ data received at 502. For example, prediction service 124 may apply a filter that has been configured to retain data used to define the archetypes and remove all other data. The filter may be the same filter used in process 300 and/or 400. After filtering, each piece of remaining data may be broadly classified into one of two categories. The data may be a string (e.g., location), or the data may be a numeric value (e.g., income).

At 506, prediction service 124 may determine which archetype matches the filtered MeF++ data as determined at 504. For example, prediction service 124 may use the same clustering algorithm(s) used in process 300 and/or 400 to associate the filtered MeF++ data as determined at 504 with a cluster stored in archetype database 126. The clustering and matching may be determined based on an overall reduced MeF++ clustering if the data in archetype database 126 was determined using process 300, or clustering and matching may be determined based on clustering against one or more tiered archetypes if the data in archetype database 126 was determined using process 400.

At 508, prediction service 124 may compare the full MeF++ received at 502 with the full set of MeF++ data (e.g., not only the reduced MeF++ or tiered data) for all MeF++ examples associated with the matching archetype from archetype database 126. Accordingly, the comparison may identify data that is typically present in the MeF++ examples associated with the matching archetype but not present in the MeF++ received at 502 and/or data that is not typically present in the MeF++ examples associated with the matching archetype but present in the MeF++ received at 502.

At 510, prediction service 124 may identify differences determined at 508 that may be predictive of optimization opportunities for the MeF++ received at 502. For example, prediction service 124 may identify data, that is typically present in the MeF++ examples associated with the matching archetype but not present in the MeF++ received at 502, that may result in improved tax refund outcomes and/or reduced audit probabilities for an MeF++. For example, prediction service 124 may identify that other members of the archetype tended to report making maximum contributions to an IRA, while the MeF++ received at 502 did not report making maximum contributions to an IRA (e.g., indicating that the taxpayer submitting the MeF++ received at 502 may get a better return if they make the maximum contributions to the IRA). In another example, prediction service 124 may identify data, that is not typically present in the MeF++ examples associated with the matching archetype but is present in the MeF++ received at 502, that may result in reduced tax refund outcomes and/or increased audit probabilities for an MeF++. For example, prediction service 124 may determine that the MeF++ received at 502 reports significantly higher expenses than other MeF++ examples having similar adjusted gross incomes (e.g., indicating that the MeF++ received at 502 may have a higher audit risk than normal).

At 512, prediction service 124 may optimize the MeF++ received at 502 based on the differences determined at 510. For example, if processing at 510 determined that a specific deduction or credit was used by most members of the archetype cluster but not present in the MeF++ received at 502, prediction service 124 may generate data suggesting that the user should take the deduction or credit and transmit the data to client 130, allowing the user to make the adjustment, and/or automatically adjust the the MeF++ received at 502 to include the deduction or credit. In another example, if processing at 510 determined a specific difference (e.g., a possible error) present in the MeF++ received at 502 but absent from the data of most members of the archetype cluster, prediction service 124 may generate data suggesting that the user should consider revising the possible error and transmit the data to client 130, allowing the user to make the adjustment, and/or automatically adjust the the MeF++ received at 502 to fix the possible error. In another example, if processing at 510 determined that a specific deduction or credit was used by most members of the archetype cluster but not available for the MeF++ received at 502, prediction service 124 may generate data suggesting that the user should make changes to make the deduction or credit available next year and transmit the data to client 130.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   filtering, by a processor, received data to generate a subset of the received data less than an entire set of the received data, the subset including at least one string and at least one numeric value, wherein the received data includes a combination (MeF++) of modernized e-file (MeF) data and additional data;
   matching, by the processor, the at least one string and the at least one numeric value to one of a plurality of stored archetypes by applying a computer clustering algorithm, each stored archetype including a subset of stored archetype data less than an entire set of stored archetype data;
   comparing, by the processor, the entire set of received data to the matched stored archetype data to identify at least one difference between the entire set of received data and the matched stored archetype data; and
   applying, by the processor, at least one optimization to address the at least one difference by applying on the received data an option common to the matched stored archetype data but missing from the received data.

2. The method of claim 1, wherein the clustering algorithm includes k-means clustering.

3. The method of claim 1, wherein the stored archetype data includes data describing a plurality of taxpayers previously determined to be similar to one another.

4. The method of claim 3, wherein the option includes a tax return option common to the plurality of taxpayers but not applicable to the received data.

5. The method of claim 4, wherein applying the at least one optimization includes generating a user interface prompt to utilize the tax return option.

6. The method of claim 4, wherein applying the at least one optimization includes adjusting the received data to include the tax return option.

7. The method of claim 1, wherein applying the at least one optimization includes automatically adjusting the received data.

8. The method of claim 1, further including generating, by the processor, the archetype data.

9. The method of claim 8, wherein generating the archetype data includes:
   receiving a plurality of previously-entered data sets;
   for each of the previously-entered data sets:
      filtering the data set to generate a subset of the data set less than the entire data set, the subset including at least one string and at least one numeric value;
      classifying the at least one string by applying a first machine learning algorithm to obtain first classified data;
      classifying the at least one numeric value by applying a second machine learning algorithm to obtain second classified data; and
      grouping the first classified data and the second classified data into a consolidated model;
   clustering the consolidated models to a plurality of archetypes by applying the clustering algorithm to generate the archetype data.

10. The method of claim 9, wherein the first machine learning algorithm includes Bayes classification.

11. The method of claim 9, wherein the second machine learning algorithm includes k-nearest neighbor classification.

12. The method of claim 9, wherein the clustering algorithm includes k-means clustering.

13. The method of claim 9, wherein the plurality of previously-entered data sets include modernized e-file (MeF) data.

14. The method of claim 13, wherein the plurality of previously-entered data sets include a combination (MeF++) of the MeF data and additional data.

15. The method of claim 9, wherein the plurality of archetypes are defined to describe members of a common group.

16. The method of claim 9, wherein the plurality of archetypes are defined to describe a plurality of taxpayers having similar characteristics.

17. The method of claim 9, further comprising, for each of the previously-entered data sets, dividing the filtered data set into a plurality of subsets, wherein the classifying and grouping are performed on each of the plurality of subsets.

18. The method of claim 17, wherein the plurality of archetypes includes a plurality of sub-archetypes formed by the clustering.

19. A system comprising:
   a processor configured to:
   filter received data to generate a subset of the received data less than an entire set of the received data, the subset including at least one string and at least one numeric value, wherein the received data includes a combination (MeF++) of modernized e-file (MeF) data and additional data;
   match the at least one string and the at least one numeric value to one of a plurality of stored archetypes by applying a computer clustering algorithm, each stored archetype including a subset of stored archetype data less than an entire set of stored archetype data;
   compare the entire set of received data to the matched stored archetype data to identify at least one difference between the entire set of received data and the matched stored archetype data; and
   apply at least one optimization to address the at least one difference by applying on the received data an option common to the matched stored archetype data but missing from the received data.

20. The system of claim 19, wherein the clustering algorithm includes k-means clustering.

21. The system of claim 19, wherein the stored archetype data includes data describing a plurality of taxpayers previously determined to be similar to one another.

22. The system of claim 21, wherein the option includes a tax return option common to the plurality of taxpayers but not applicable to the received data.

23. The system of claim 22, wherein the processor is configured to apply the at least one optimization by generating a user interface prompt to utilize the tax return option.

24. The system of claim 22, wherein the processor is configured to apply the at least one optimization by adjusting the received data to include the tax return option.

25. The system of claim 19, wherein the processor is configured to apply the at least one optimization by automatically adjusting the received data.

26. The system of claim 19, wherein the processor is configured to generate the archetype data.

27. The system of claim 26, wherein the processor is configured to generate the archetype data by:
   receiving a plurality of previously-entered data sets;
   for each of the previously-entered data sets:

filtering the data set to generate a subset of the data set less than the entire data set, the subset including at least one string and at least one numeric value;

classifying the at least one string by applying a first machine learning algorithm to obtain first classified data;

classifying the at least one numeric value by applying a second machine learning algorithm to obtain second classified data; and grouping the first classified data and the second classified data into a consolidated model;

clustering the consolidated models to a plurality of archetypes by applying the clustering algorithm to generate the archetype data.

28. The system of claim 27, wherein the first machine learning algorithm includes Bayes classification.

29. The system of claim 27, wherein the second machine learning algorithm includes k-nearest neighbor classification.

30. The system of claim 27, wherein the clustering algorithm includes k-means clustering.

31. The system of claim 27, wherein the plurality of previously-entered data sets include modernized e-file (MeF) data.

32. The system of claim 31, wherein the plurality of previously-entered data sets include a combination (MeF++) of the MeF data and additional data.

33. The system of claim 27, wherein the plurality of archetypes are defined to describe members of a common group.

34. The system of claim 27, wherein the plurality of archetypes are defined to describe a plurality of taxpayers having similar characteristics.

35. The system of claim 27, wherein the processor is further configured to, for each of the previously-entered data sets, divide the filtered data set into a plurality of subsets, wherein the classifying and grouping are performed on each of the plurality of subsets.

36. The system of claim 35, wherein the plurality of archetypes includes a plurality of sub-archetypes formed by the clustering.

* * * * *